United States Patent
Chameroy et al.

(10) Patent No.: US 7,624,674 B2
(45) Date of Patent: Dec. 1, 2009

(54) PRESSURE COOKER COMPRISING CALIBRATED LEAKAGE MEANS

(75) Inventors: Eric Chameroy, Veronnes (FR); Pascal Roland Clément Murat, Fontaine les Dijon (FR)

(73) Assignee: SEB S.A., Ecully (FR)

( * ) Notice: Subject to any disclaimer, the term of this patent is extended or adjusted under 35 U.S.C. 154(b) by 926 days.

(21) Appl. No.: 10/484,361

(22) PCT Filed: Jul. 22, 2002

(86) PCT No.: PCT/FR02/02618

§ 371 (c)(1),
(2), (4) Date: Jun. 25, 2004

(87) PCT Pub. No.: WO03/011087

PCT Pub. Date: Feb. 13, 2003

(65) Prior Publication Data

US 2004/0237796 A1 Dec. 2, 2004

(30) Foreign Application Priority Data

Jul. 20, 2001 (FR) .................................. 01 09898

(51) Int. Cl.
*A23L 1/00* (2006.01)
(52) U.S. Cl. .......................... 99/337; 99/403; 220/314; 220/316; 220/912
(58) Field of Classification Search ........... 99/337–340, 99/403–418, 330, 342, 449, 341, 467; 220/314–316, 220/573.1, 203.01, 324–327, 203.09, 203.19, 220/203.22, 912; 126/373.1; 292/DIG. 11, 292/57–66
See application file for complete search history.

(56) References Cited

U.S. PATENT DOCUMENTS

| | | | | |
|---|---|---|---|---|
| 2,501,185 | A | 3/1950 | Moorhead | 236/92 |
| 2,538,567 | A * | 1/1951 | Jones | 219/452.13 |
| 2,563,563 | A | 8/1951 | Swenson | 137/53 |
| 4,434,909 | A * | 3/1984 | Ott | 220/316 |
| 5,442,998 | A * | 8/1995 | Niese | 99/337 |
| 5,724,884 | A | 3/1998 | Fischbach | 99/337 |
| 6,425,320 | B1 * | 7/2002 | Chameroy et al. | 99/337 |

FOREIGN PATENT DOCUMENTS

| | | |
|---|---|---|
| EP | 0596163 | 5/1994 |
| EP | 0794366 | 9/1997 |
| EP | 1277427 A1 * | 1/2003 |
| GB | 2035837 | 6/1980 |

* cited by examiner

*Primary Examiner*—Timothy F. Simone
(74) *Attorney, Agent, or Firm*—Thomas, Kayden, Horstemeyer & Risley, LLP

(57) ABSTRACT

A household appliance for cooking under pressure, the appliance being provided with bistable calibrated leakage means suitable for taking up an open position in which the pressure inside the appliance is allowed to increase continuously to above a determined pressure $P_0$, while also allowing air to be bled from the appliance, and a closed position corresponding to an absence of leakage of air to the outside, the open position being sustained until a predetermined pressure value $P_1$ is reached. Rather than being sustained until the predetermined pressure $P_1$ is reached, the open position is sustained for one of a predetermined time interval $\Delta t$ after $P_0$ is reached, and until a predetermined temperature value $T_1$ is reached. The appliance is provided with at least one closure/opening safety means whose position is sensitive to pressure.

18 Claims, 5 Drawing Sheets

PRESSURE COOKER COMPRISING CALIBRATED LEAKAGE MEANS

TECHNICAL FIELD

The present invention relates to the general field of household appliances for cooking under pressure, such an appliance including a bowl and a lid designed to be locked onto the bowl so as to make it possible for the pressure inside the appliance to be increased, and for food contained in the bowl to be cooked under pressure.

The present invention relates to a household appliance for cooking under pressure, the appliance including a cooking bowl and a lid designed to be locked onto the bowl so as to make it possible for the pressure inside the appliance to be increased, and for food to be cooked under pressure.

The present invention also relates to a method of cooking food under pressure in a closed vessel, in which method the pressure or the temperature inside the vessel containing the food is increased.

PRIOR ART

It is already known that household pressure-cooking appliances of the pressure cooker type can be equipped with pintle or flap valve member systems reacting to the pressure prevailing inside the appliance to close the appliance in leaktight manner at or above a determined pressure.

In general, such valve member systems are mounted in the lid of the appliance to move in a valve seat between low and high abutment positions. Once the lid has been locked onto the bowl, the valve member systems go progressively from their low abutment positions to their high abutment positions, under the influence of the heating of the gaseous medium present in the bowl at the beginning of cooking. Known systems thus react to the progressive increase in pressure, and allow a small quantity of an air/steam mixture to escape until the valve member reaches its high abutment position.

Such systems enable a pressure cooker to operate acceptably, but they suffer from a drawback related to the persistence of the presence of air in the gaseous cooking medium. The valve member reaches the high abutment position at a temperature or pressure value that is poorly controlled and imprecise, and in any event at a pressure or temperature (about 70° C.) that is low, giving rise to the valve member closing prematurely, so that the cooking medium still contains a non-negligible fraction of air, which is prejudicial to the food being cooked well in a cooking time optimized for the pressure/temperature relationship.

In addition, in known household pressure-cooking appliances, a pintle system reacting to pressure is also associated with an opening or improper-closure safety device serving to allow the pressure inside the pressure cooker and thus inside the valve member system to increase only if the lid is correctly positioned and locked. It can thus be understood that, for safety reasons, valve member systems are designed to reach their high abutment positions at pressure values that are relatively low, and in any event generally lower than 4 kilopascals (kPa), which is the value commonly accepted for user-safe opening. Such devices prevent the escape of air that results from the beginning of cooking.

SUMMARY OF THE INVENTION

The objects assigned to the invention are thus to remedy the various above-mentioned drawbacks, and to provide a novel method and a novel appliance for household cooking under pressure, making it possible to bleed air from the appliance under pressure as fully as possible and in controlled manner, but without preventing the pressure increase or temperature increase stage from taking place properly, and in particular without lengthening the cooking time, or degrading the quality of the food.

Another object of the invention is to provide a novel cooking appliance making it possible to bleed off the air as effectively as possible before the cooking stage proper, while also offering safety of as high a level as possible, enabling the appliance to lock as soon as low pressure values are reached.

Another object of the invention is to provide a novel cooking appliance that is of particularly simple and effective design and that does not interfere with operation of other devices of the appliance, in particular its safety devices.

Another object of the invention is to provide a novel cooking appliance in which the bleed system is easy to incorporate.

The objects assigned to the invention are achieved by means of a household appliance for cooking under pressure, the appliance including a cooking bowl and a lid designed to be locked onto the bowl so as to make it possible for the pressure inside the appliance to be increased, the appliance being provided with bistable calibrated leakage means suitable for taking up firstly an open position in which the pressure inside the appliance is allowed to increase continuously to above a determined pressure $P_0$, while also allowing air to be bled from the appliance, and secondly a closed position corresponding to an absence of leakage of air to the outside, the open position being sustained for a predetermined time interval $\Delta t$ after reaching $P_0$ or its corresponding temperature value $T_0$, or until predetermined values are reached for the pressure or the temperature prevailing in the appliance, respectively $P_1$ and $T_1$, where $P_1 > P_0$, and $T_1 > T_0$, the appliance being provided with at least one closure/opening safety means, of the valve type, whose position is sensitive to the pressure prevailing in the bowl, and which is mounted to move between two stable abutment positions, namely a first position in which the means puts the inside of the bowl into communication with the outside below the determined pressure $P_0$, and a second position in which the means close off communication from the bowl to the outside when the pressure $P_0$ is reached, so as to allow the pressure inside the appliance to increase and so as to allow cooking to take place.

The objects assigned to the invention are also achieved by means of a method of cooking food under pressure in a closed vessel, in which method:

the pressure or the temperature inside the vessel containing the food is allowed to increase;

a step is performed in which air and steam are bled from the vessel while also allowing the pressure inside the vessel to increase, the step lasting for a time sufficient to ensure that substantially all of the air has been bled from the vessel, or until a predetermined pressure or temperature is reached;

then bleeding is stopped by making the vessel fully leaktight; and the food is cooked under pressure;

the method being characterized in that the pressure or temperature inside the vessel containing the food is allowed to increase by appliance-opening safety means that are sensitive to pressure and that close the vessel as from a determined pressure, preferably less than or equal to 4 kPa, and the step in which air and steam are bled is performed once the safety means have closed.

BRIEF DESCRIPTION OF THE DRAWINGS

Other objects and advantages of the invention appear in greater detail on reading the following description with reference to the accompanying drawings which are given by way of non-limiting illustrative example, and in which.

DETAIL DESCRIPTION

In the following examples, the air bleed systems or calibrated leakage means of the invention are incorporated or mounted in a household appliance for cooking under pressure, of the pressure cooker type, comprising in a manner known per Se a cooking bowl (not shown in the figures) and a lid 2 serving to be locked onto or fitted to the bowl by any suitable means, so as make it possible for the pressure inside the appliance to be increased, and for food to undergo cooking proper. The air bleed systems of the invention are designed to be incorporated in and fitted in any type of pressure cooker, independently of the system for locking the lid to the bowl, regardless of whether it is a locking system that uses a locking bar, ramps on the bowl and on the lid, jaws mounted to move radially, or any other system. The household pressure-cooking appliances concerned by the invention are thus locking-bar pressure cookers, bayonet-fitting pressure cookers, radial-jaw pressure cookers, or "manhole" pressure cookers, this list naturally being given merely by way of non-limiting illustration.

In the invention, the cooking appliance is provided with calibrated leakage means enabling preferably all of the air to be bled from the pressure cooker before the appliance is regulated at its normal pressure or before the pressure level is sustained at a constant level (in pressure cookers having a visual pressure indicator), corresponding to the cooking stage proper. In the invention, the calibrated leakage means may be of a plurality of types, corresponding to various modes of triggering. Thus, the trigger parameter may be the temperature reached by the gaseous medium, the pressure of said gaseous medium or else a time interval that is predetermined, thus corresponding substantially to an estimated reference temperature or pressure.

The general principle of the invention is based on implementing calibrated leakage means or a calibrated leakage system that allows air to escape until a given temperature or pressure is reached, while simultaneously enabling the pressure inside the appliance to increase so as to obtain an overall cooking time that is short.

Thus, the household pressure-cooking appliance of the invention is provided with bistable calibrated leakage means suitable for taking up firstly an open position in which the pressure inside the appliance can increase continuously to above a determined pressure $P_0$, while allowing air to be bled from the appliance, and secondly a closed position corresponding to an absence of air leakage to the outside, the open position being sustained for a predetermined time interval $\Delta t$ after reaching $P_0$ or its corresponding temperature value $T_0$, or until predetermined values are reached for the pressure or the temperature prevailing in the appliance, respectively $P_1$ and $T_1$, where $P_1 > P_0$, and $T_1 > T_0$.

Figure 1:
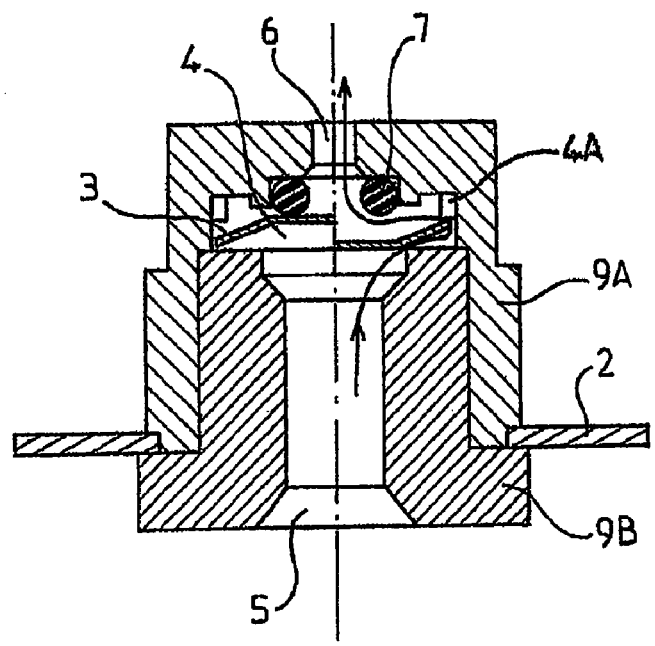
FIG. 1 is a fragmentary section view of a first embodiment of calibrated leakage means of the invention that react to temperature.

Thus, in a first variant embodiment, as shown in FIG. 1, the calibrated leakage means may be sensitive to temperature and may be formed by a bimetallic piece 3 that is, for example, disk-shaped, and that is incorporated in a chamber 4 defined between two parts mounted one on the other, e.g. by interfitting, screw-fastening, or crimping in particular, and formed by a top body 9A and a bottom body 9B mounted one in the other in a hole through the lid 2. The top body 9A is in communication with the outside of the pressure cooker, and thus with atmospheric pressure, via a calibrated opening 6 of any shape, e.g. circular or oval. The bottom body 9B is in communication with the inside of the pressure cooker via an internal orifice 5 of any shape and, for example in axial alignment with the calibrated opening 6.

Advantageously, as shown in FIG. 1, the bimetallic disk 3 may be held in position via its periphery by means of spaced-apart crenellations 4A integral with the top body 9A, the total through section between the crenellations naturally being greater than the section of the calibrated opening 6, so that air and steam coming from inside the pressure cooker and escaping via the calibrated opening 6 can pass through freely. An O-ring gasket 7 is positioned in a recess in the top body 9A to surround the calibrated opening 6 and to serve as a leaktight support for the bimetallic disk 3 when it takes up its high, closed position, as shown in the left portion of FIG. 1.

Thus, in its position shown in the right half of FIG. 1, the bimetallic disk 3 is held in the open position, so that, at the beginning of cooking, it allows air to pass from the pressure cooker via its periphery and between the crenellations, the air then escaping through the calibrated opening 6. In its position shown in the left portion of FIG. 1, the bimetallic disk 3 has changed shape due to the increase in the temperature inside the pressure cooker, and thus comes into leaktight abutment against the O-ring gasket 7, thereby itself directly closing the calibrated opening 6 at a characteristic temperature $T_1$ that is characteristic of the bimetallic disk 3 and that corresponds to its component materials deforming.

As is well known to the person skilled in the art, the deformation characteristics of bimetallic pieces are reversible, and, when the temperature falls again at the end of cooking, the bimetallic disk 3 returns to its initial open position corresponding to the left portion of FIG. 1.

Thus, in the invention, the air leakage allowed by the calibrated opening 6 is sufficiently small and controlled to enable the pressure inside the pressure cooker to rise normally and without disturbance, while enabling said calibrated opening 6 to allow air to escape until the closure temperature of the device is reached, which closure temperature is not less than 100° C.±2° C., or preferably equal to 102° C.±2° C., it being possible for the closure temperature to be as high as about 104° C. After closure, the optimum food cooking temperature is reached, and is approximately in the range 105° C. to 120° C.

Advantageously, in order to satisfy the above-mentioned closure temperature conditions, the calibrated leakage means of the invention comprise at least one calibrated opening 6 allowing leakage equivalent to an opening of section lying in the range 1.75 square millimeters (mm$^2$) to 4.15 mm$^2$, and preferably about 2.80 mm$^2$, and a closure element (the bimetallic disk 3, in this example) which is mounted to move and is mounted in association with said at least one calibrated opening 6.

Various variable parameters have been taken into account for determining the limits of this preferred calibrated leakage section, while bearing in mind that the aim is to guarantee:

effective air bleeding while departing little from the ideal steam pressure/temperature curve; and reliability for the device that must act in spite of these various parameters and in spite of the inevitable dispersions related to the test conditions and to the component parts of the device.

The parameters having an influence taken into account were: bleed time, operating pressure, heating power, level to which the pressure cooker is filled, and mean temperature of the steam.

Figure 2:
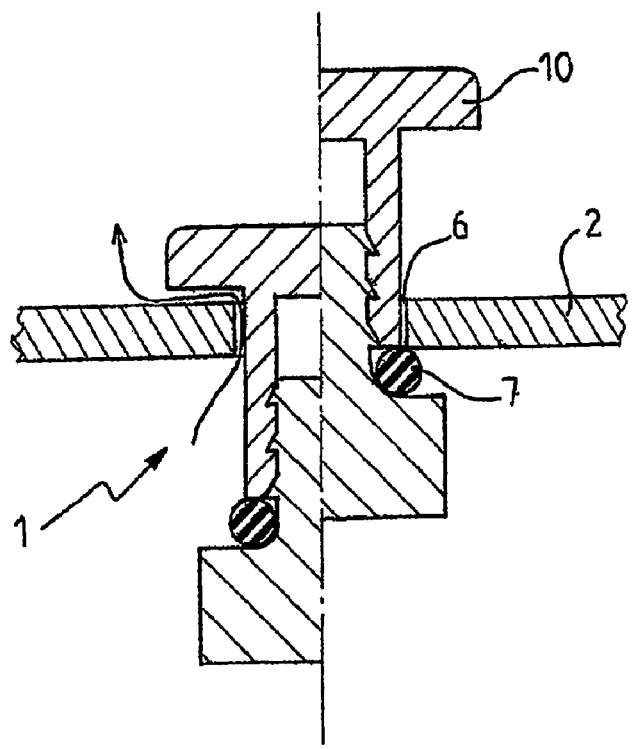
FIG. 2 is a fragmentary section view of a second embodiment of calibrated leakage means of the invention that react to pressure.

By way of a variant embodiment (not shown in the figures), instead of the bimetallic disks, the means reacting to the temperature prevailing inside the appliance may comprise a wax actuator or a solenoid valve associated with a temperature sensor or with any equivalent means. By way of an additional variant, as shown in FIG. 2, the calibrated air leakage means may comprise a heavy valve pintle 10 mounted to slide freely in a bore in the lid 2 between two abutment positions. When the pintle 10 is in the position shown in the left portion of FIG. 2, the respective dimensions and shapes of the bore and of the pintle 10 are such that a calibrated orifice 6 is provided peripherally between the pintle 10 and the lid 2, allowing air or steam to escape until a predetermined pressure value $P_1$ is reached. Conversely, since the bottom portion of the pintle 10 is provided with an O-ring gasket 7 supported by a collar, then when the predetermined pressure $P_1$ is reached, the pintle 10 reaches its high position shown in the right portion of FIG. 2, with the O-ring gasket 7 then coming to close the calibrated opening 6 in leaktight manner.

Thus, in the invention, the bistable calibrated leakage means are formed by associating a calibrated opening 6 with means sensitive to temperature or to pressure, or else with means making it possible to count down a time interval and closing or releasing said calibrated opening 6.

Figure 9A:
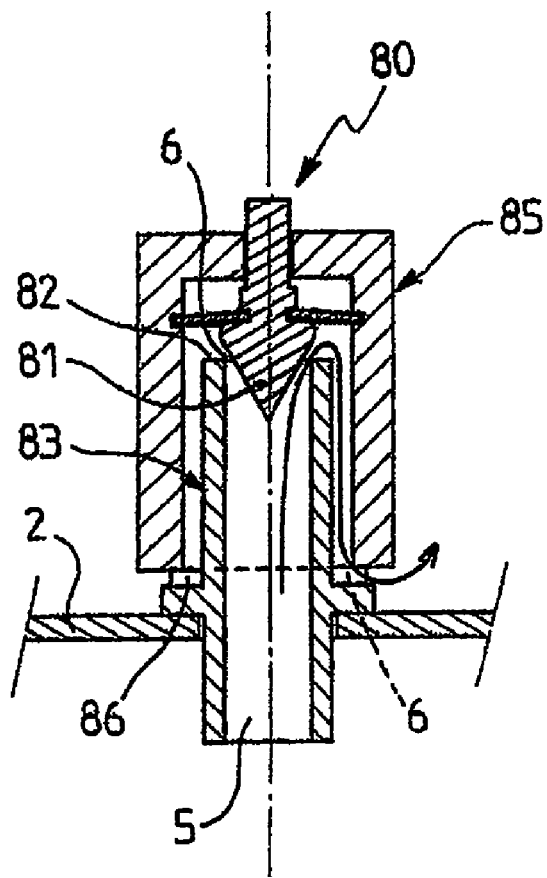
FIGS. 9A and 9B are fragmentary section views showing another embodiment of a bleed system of the invention that reacts to temperature.
Figure 9B:
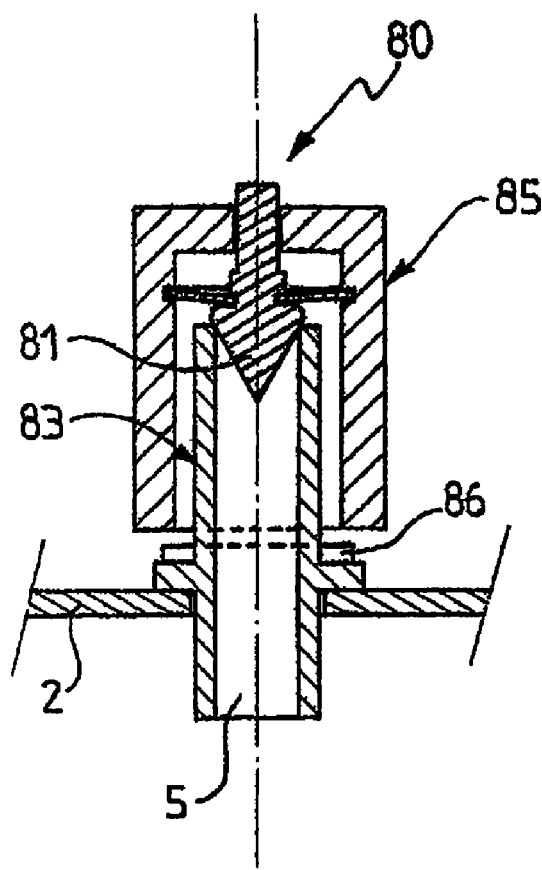

By way of an additional variant, as shown in FIGS. 9A and 9B, the bimetallic disk 3 may be associated with a heavy valve pintle 80 provided at one end with a spike 81 designed to come into engagement with a spike-receiving seat formed by the top portion 82 of a through hollow tubular body 83 fitted by any known means to the lid 2 and putting the inside of the pressure cooker into communication with the outside via the orifice 5. In this variant, the bimetallic disk 3 is secured to the inside of a top body 85 forming a cap and designed to fit over the tubular body 83 so as to come, in a rest position, into abutment against studs 86 defining a crenellated collar that projects radially from said tubular body 83. In this embodiment, the bimetallic disk 3, which extends transversely inside the top body 85, is provided with a central hole in which the heavy valve pintle 80 is mounted axially and fixed, the heavy valve pintle also projecting axially from the top body 85 via a bore in which it slides freely, so that, at the beginning of cooking (FIG. 9A), the calibrated orifice 6 defined between the periphery of the spike 81 and the top portion 82 is open, thus corresponding to an open or bleed position in which the calibrated leakage means allow air to escape. Once the temperature corresponding to the bimetallic disk 3 changing shape has been reached (FIG. 9B), the bimetallic disk 3 changing shape enables the top body 85 to move axially upwards, and enables the spike 81 to move in the opposite direction and to come to close off the calibrated opening 6 by resting in leaktight manner against the top end 82.

In this variant, the bimetallic disk 3 and the heavy valve pintle 80 may be pre-mounted in or on the top body 85 so as to form a single accessory which is easier for the user to put in place on the main body 83. In this variant embodiment, the calibrated air leakage means thus include a heavy valve pintle 80 supported by a bimetallic disk 3, itself supported by the main body 3 which is designed to be mounted facing the opening 5 in the lid 2, so that the calibrated opening 6 is defined between said heavy valve pintle 80 and the opening 5 forming the seat for receiving the pintle in leaktight manner when the bimetallic disk 3 is in the closed position (FIG. 9B), corresponding to the bleed being closed and to temperature conditions $T_1$. In this variant, the opening 5 thus underlies a tubular body 83 whose top portion 82 forms the seat for receiving the heavy valve pintle 80, the main body 85 being formed by a removable cap designed to fit over said tubular body 83.

By way of an additional variant, the calibrated opening 6 may also be formed by the opening(s) defined by the studs 86 of the crenellated collar (FIG. 9A). In this variant, the technical means implemented are identical to the preceding variant, but they are organized significantly differently. Thus, the calibrated air leakage means comprises a heavy valve pintle 80 supported by a bimetallic disk 3, itself supported by a tubular body 83 serving to be mounted facing an opening 5 in the lid 2, said opening 5 forming the seat for receiving the pintle 80 in leaktight manner when the bimetallic disk 3 is in the closed position, the calibrated opening 6 being formed by openings defined in a crenellated collar forming an abutment for the tubular body 83 when the bleed is open.

Advantageously, the cooking appliance of the invention may also be provided with pressure cooker closure/opening safety means of the safety valve type, having a valve member mounted to move between two stable abutment positions, with its position being sensitive to the pressure prevailing in the bowl. In the first stable abutment position, the safety means put the inside of the bowl into communication with the outside when the pressure is below the determined pressure $P_0$, and in the second stable abutment position, the safety means close off communication between the bowl and the outside when the pressure $P_0$ is reached, so that the pressure inside the appliance can be increased and so that cooking can take place. Such opening/closure safety means are well known to the person skilled in the art, and they make it possible to ensure that the lid is indeed in the stable locked position on the bowl, it being possible for the valve member to move under pressure only if the stable locked position is indeed reached. This prevents the pressure from increasing while the lid is improperly locked. Conversely, such closure/ opening safety means prevent the appliance from being opened in untimely manner while residual pressure remains in the appliance, because only the low position of the safety valve member makes it possible for the appliance to be opened.

By associating the bistable calibrated leakage means of the invention with closure/opening safety means, it is possible to obtain a pressure cooker which is very safe, and in which the safety system is triggered early, thereby procuring good user safety while still enabling the air to be bled effectively from the appliance, by means of the existence of a calibrated leak that does not interfere with the rising of the valve member of the closure safety means.

In particularly advantageous variant embodiments, the appliance of the invention is provided with calibrated leakage means which are incorporated in the safety device itself. The variants of the invention that correspond to this configuration are shown in FIGS. 3, 4, and 7.

Figure 3:
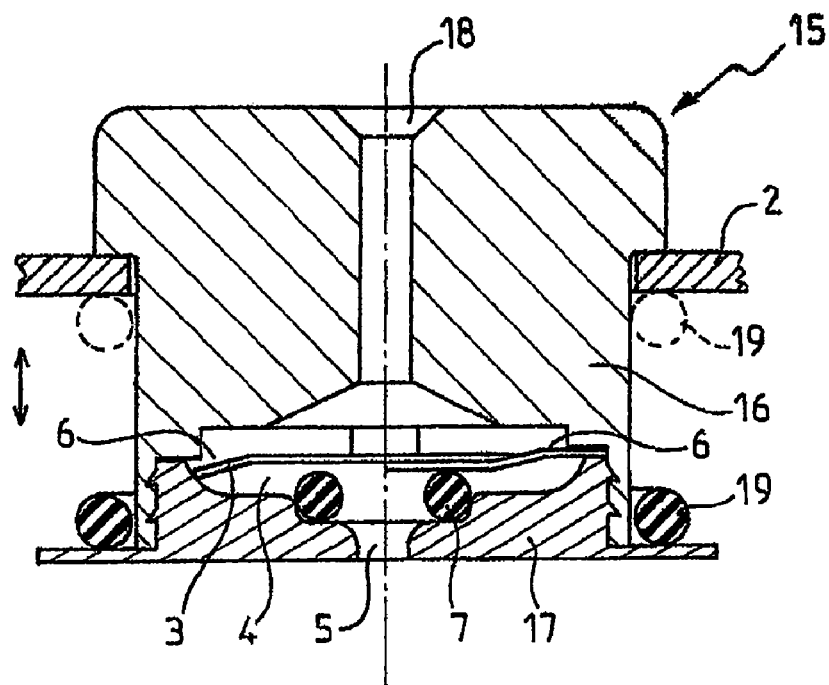
FIG. 3 is a fragmentary section view of a third embodiment of a system of the invention that reacts to temperature and that is incorporated in a closure safety device.
Figure 4:
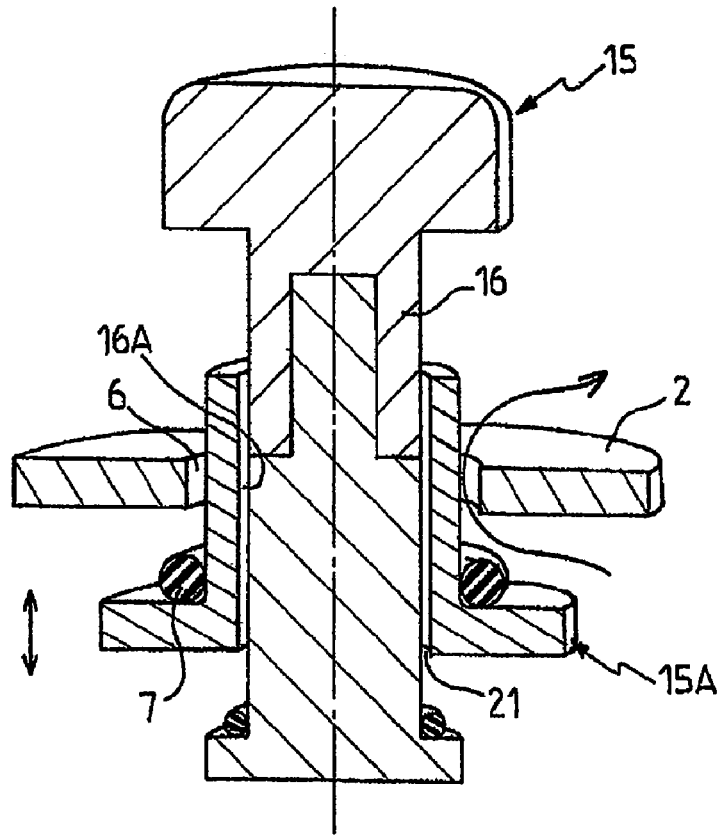
FIG. 4 is a fragmentary section view of a fourth embodiment of calibrated leakage means of the invention that react to pressure and that are incorporated in a closure safety device.
Figure 7:
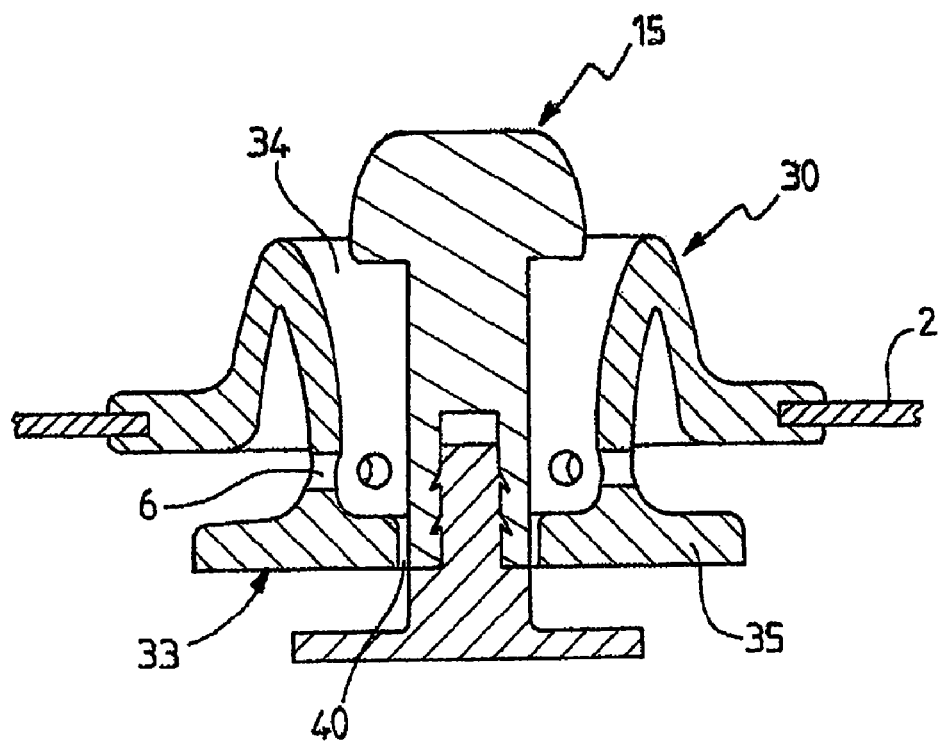
FIG. 7 is a fragmentary section view of a seventh embodiment of calibrated leakage means of the invention, corresponding to the embodiment shown in FIG. 5, but incorporated in a closure safety device.

In the preferred variants of the invention shown in FIGS. 3, 4, and 7, the bistable calibrated leakage means are incorporated or supported in an Aroma pintle 15 which constitutes pressure cooker closure safety means in the meaning of the invention. The Aroma pintle 15, which is of the pressure-gauge rod type, serves to perform the opening and closure locking function for locking the lid 2 onto the bowl as soon as a minimum pressure, e.g. about 4 kPa, is reached inside the pressure cooker. As soon as the minimum pressure value is reached, the Aroma pintle 15 rises from its low abutment position (shown in FIG. 3) to reach its high abutment position in which the pressure cooker is pressure-tight. In the high abutment position, the Aroma pintle 15 comes to engage in a corresponding hole provided in a fixed member of the pressure cooker, e.g. secured to a bowl handle, so that opening or closure of the pressure cooker is prevented. Since such safety means are well known to the person skilled in the art, they are not described in any further detail below.

The variant shown in FIG. 3 includes a bimetallic disk 3 mounted in a chamber 4 provided between the bottom portion of the body 16 of the Aroma pintle 15 and a separate part 17 mounted on the bottom portion. The chamber 4 is in fluid communication with the outside and with the inside of the pressure cooker respectively via a through channel 18 provided through the body 16, and via an opening 5 provided through the separate part 17 and preferably in axial alignment with the channel 18. The bimetallic disk 3 is held and supported elastically at least in part by an O-ring gasket 7 in the chamber 4, and as shown in the right half-portion of FIG. 3, the bimetallic disk closes off the calibrated opening 6 as soon as the determined minimum temperature value $T_1$ is reached inside the pressure cooker. The left half-portion of FIG. 3 shows the bimetallic disk 3 in the position in which it opens the calibrated opening 6, corresponding to the bimetallic disk 3 deforming, its deformation being associated with a temperature value that is lower than the predetermined temperature $T_1$. In this open position, air can be bled from the pressure cooker via the orifice 5 and via the channel 18 through the calibrated opening 6, although the Aroma pintle 15 occupies its sealing high position, the annular O-ring gasket 19 being in leaktight elastic abutment against the bottom face of the lid 2. In this position, the pressure inside the pressure cooker increases from the beginning of cooking, while simultaneously allowing the air/steam mixture to be bled. In this variant, the calibrated air leakage means are incorporated in the Aroma pintle 15, and, by way of a moving closure element, they comprises a bimetallic disk supported by said Aroma pintle 15.

The variant embodiment shown in FIG. 4 is an embodiment in which the bleed system of the invention reacts to pressure. In this variant, the calibrated leakage means are incorporated in a first Aroma pintle 15 and are formed by a second Aroma pintle 15A that is concentric with said first Aroma pintle 15 (by being disposed outside or preferably inside said first Aroma pintle), and mounted to move axially relative thereto. This variant thus corresponds to a double Aroma pintle 15A in which the first Aroma pintle 15 makes the appliance pressure-tight as soon as a first pressure level, e.g. about 4 kPa, is reached, by coming to close the outlet orifice 21 provided between the outside periphery of the body 16 and the inside periphery 16A of the second Aroma pintle 15A. The second Aroma pintle 15A is of weight and dimensions such that, when the first Aroma pintle 15 is in this high abutment position, said second Aroma pintle opens the calibrated opening 6 provided between the outside periphery of the body 16A and a bore in the pressure cooker, the bore advantageously being situated in the lid 2. In this position, although the pressure inside the pressure cooker increases, bleeding can take place before the final cooking pressure is reached. As soon as the final operating pressure is reached, the second Aroma pintle 15A takes up its high, abutment position in which the O-ring gasket 7 closes off the calibrated opening 6 in elastic and leaktight manner.

Figure 5:
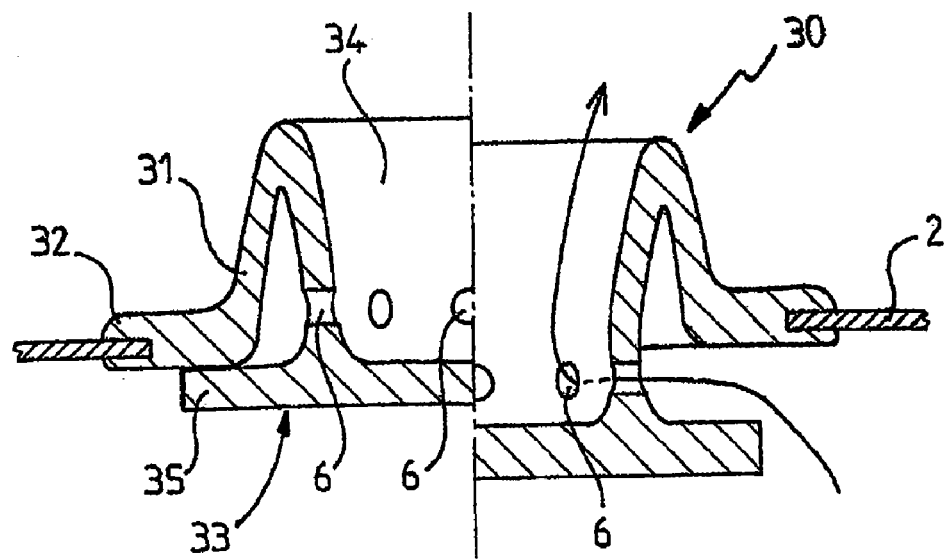
FIG. 5 is a fragmentary section view of a fifth embodiment of calibrated leakage means of the invention that react to pressure.

The variant embodiment shown in FIG. 5 shows calibrated leakage means formed of a deformable gasket 30 that can be deformed under drive from the pressure to come to close off at least one calibrated opening 6, and preferably a plurality of calibrated openings 6. In this variant, the deformable gasket 30 is incorporated in a bore in the pressure cooker, and, for example, in the lid 2, and it comprises a deformable diaphragm 31 which is connected, e.g. by interfitting, via one of its ends 32 to the edge of the bore, and which defines, in the vicinity of its other end 33, a central well 34 through the wall of which at least one calibrated hole 6 is provided. This configuration defines a sort of convex collar whose central zone is folded inwards and is open to form the central well 34. The central well 34 is terminated by a sealing face 35 forming a sealing collar that serves to press against the body of the gasket formed by the bottom face of the end 32, as from a predetermined pressure value that is not less than a reference value $P_1$. The left half-portion of FIG. 5 shows the sealing position of the deformable diaphragm 30, which position is reached as from a predetermined pressure value $P_1$, while the right half-portion of FIG. 5 shows the open position of said deformable diaphragm 30. In said open position, air can be bled from the pressure cooker even though its pressure increases simultaneously in conventional manner.

FIG. 7 shows a variant using the configuration of a deformable gasket 30 as shown in FIG. 5. In this variant embodiment, the deformable gasket 30 incorporates a conventional Aroma pintle 15 which is mounted to slide freely in the central well 34 between two stable abutment positions. As shown, the sealing face 35 is provided with a hole 40 in which the Aroma pintle 15 is mounted to slide freely, the two sides of the sealing face 15 around the hole 40 forming a sealing seat for the two abutment positions of the Aroma pintle 15. A bleed system of the invention is thus obtained associated with pressure cooker closure/opening safety means.

Figure 6:
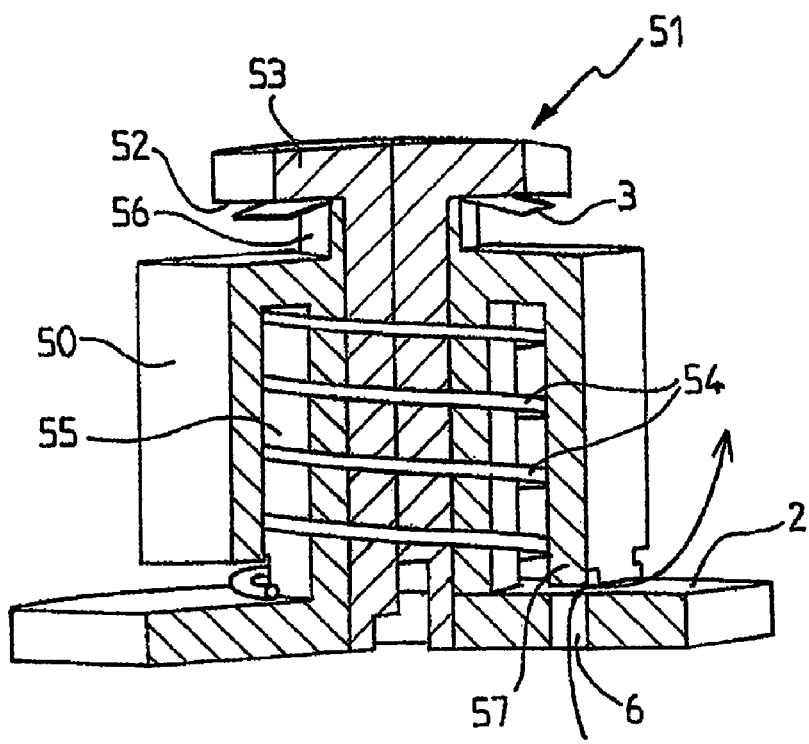
FIG. 6 is a fragmentary section view of a sixth embodiment of calibrated leakage means of the invention that react to temperature and that are incorporated in a valve ramp.

The variant embodiment shown in FIG. 6 shows a bleed system of the invention that is incorporated in a ramp 50 of a valve member 51. The valve member ramp 50 is mounted to be urged resiliently into a return position against the neck 52 of a valve member 53 by means of a helical spring 54 interposed in a recess 55 in the ramp 50 between said ramp 50 and the lid 2. A bimetallic disk 3 is interposed between the neck 52 and the head 56 of the ramp 50. When the bimetallic disk 3 is in the open position, a leg 57 of the ramp 50, which leg is situated in the bottom portion thereof, opens a calibrated opening 6 provided through the lid 2, thereby making it possible for bleeding to take place. When the temperature in the cooking vessel reaches the threshold for triggering the bimetallic disk 3, said bimetallic disk snaps over and enables the calibrated opening 6 to be closed off by the leg 57, by means of the ramp 50 moving axially against the resilient force exerted by the helical spring 54. In this position, the bleed system is sealed off, the calibrated leakage means of the invention then including a bimetallic disk 3 mounted in resilient abutment against the ramp 50 of the valve member 51, the ramp being mounted to move relative to the calibrated opening 6, so that the ramp comes to open or to close said calibrated opening 6 depending on the position of the bimetallic disk 3.

Figure 8:
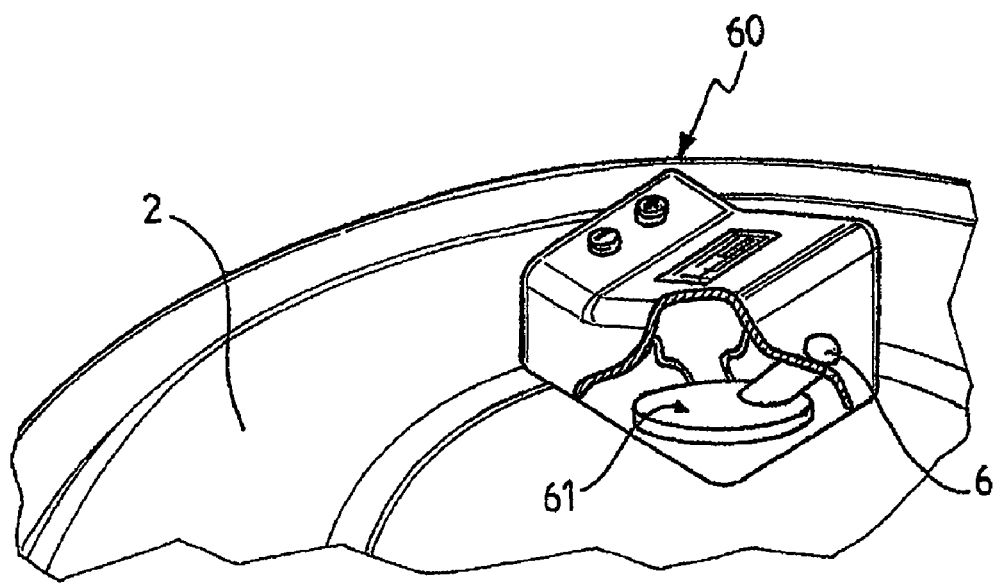
FIG. 8 is a partially exploded perspective view of an eighth embodiment of a bleed system of the invention that reacts to time.

The variant embodiment shown in FIG. 8 shows a household pressure-cooking appliance of the invention, having bistable calibrated leakage means allowing air to be bled from the appliance, the bleeding being sustained for a predetermined time interval □t after a determined pressure valve $P_0$ or its corresponding temperature value $T_0$ is reached.

In this variant, the appliance is equipped with a timer 60 of conventional type having means for counting down the predetermined time □t from the instant at which the reference pressure or temperature $P_0$ or $T_0$ is reached, and a system 61 for opening and closing a calibrated opening 6. The system 61 also incorporates a pressure or temperature sensor for sensing when the pressure $P_0$ or the temperature $T_0$ is reached. This assembly forms calibrated leakage means 60 preferably incorporated in the lid 2 of the pressure cooker. At the beginning of cooking, the timer counts down the predetermined time □t enabling all of the air to be bled from the pressure cooker via the calibrated hole 6. Once the predetermined time □t has elapsed, the opening and closure system 61 closes the calibrated hole 6. At the end of cooking, the pressure or temperature sensor incorporated in the timer can sense the drop in pressure or in temperature and thus allow the calibrated air leakage means of the invention to be opened again.

In all of the above-mentioned examples, the calibrated leakage means are presented as being preferably incorporated in or fitted to the lid 2 of the pressure cooker. In the meaning of the invention, it is however possible to incorporate such calibrated leakage means in other portions of the pressure cooker, and in particular in the bowl or in the means for taking hold of the pressure cooker, without going beyond the ambit of the invention.

Similarly, the preceding examples present a cooking appliance whose calibrated leakage means allow air to be bled from the appliance as a function of the movement of a movably mounted closure element. In the meaning of the invention, such an element may be controlled by any means well known to the person skilled in the art, and in particular by waves of the radio or electromagnetic wave type.

The invention also relates to a method of cooking food under steam pressure in a closed vessel, in which method the pressure or the temperature inside the vessel containing the food is allowed to increase. Advantageously, the pressure or temperature inside the vessel is allowed to increase by pressure cooker opening or closure safety means, which means are sensitive to pressure and close the vessel as from a determined pressure that is preferably equal to 4 kPa. In the invention, the method is characterized in that:

a step is performed in which air and steam are bled from the vessel while also allowing the pressure inside the vessel to increase, the step lasting for a time sufficient to ensure that substantially all of the air has been bled from the vessel, or until a predetermined pressure or temperature is reached;

then bleeding is stopped by making the vessel fully leak-tight; and the food is cooked under pressure.

Advantageously, the pressure or temperature inside the vessel containing the food is allowed to increase by appliance-opening safety means that are sensitive to pressure and that close the vessel as from a determined pressure, preferably less than or equal to 4 kPa, and the step in which air and steam are bled is performed once the safety means have closed.

Preferably, the method of the invention makes it possible to bleed air so that the food is cooked under a steam-only atmosphere.

Preferably, the bleeding step is performed until an average vessel temperature of approximately at least 96° C. is reached, or until a mean pressure of approximately at least 150 millibars is reached.

Preferably, the bleeding step thus takes place within a temperature range from 96° C. to 104° C., and even more preferably from 96° C. to 102° C.

The bleed system of the invention makes it possible to reduce the total cooking time significantly, and to allow the temperature of the food to be increased more quickly, thereby enabling its vitamins to be retained better because of the absence of an air/steam mixture in the cooking vessel. The system of the invention also makes it possible to satisfy the general relationships defining the increase in the temperature of water under pressure, and to limit the loss of vitamins and of mineral salts from the food.

In addition, bleeding off the air makes it possible to avoid oxidation of the food, which is a guarantee of cooking quality.

SUSCEPTIBILITY OF INDUSTRIAL APPLICATION

The invention can be applied industrially to manufacturing and designing household appliances for cooking food, in particular household appliances for cooking food under pressure, of the pressure cooker type.

The invention claimed is:

1. A household appliance for cooking under pressure, the appliance comprising a cooking bowl and a lid designed to be locked onto the bowl so as to make it possible for the pressure inside the appliance to be increased, said appliance being provided with at least one calibrated opening and bistable calibrated air leakage means arranged and configured to be positionable between an open position in which the pressure inside the appliance is allowed to increase continuously to above a determined pressure $P_0$, while also allowing air to be bled from the appliance through said opening, and a closed position corresponding to an absence of leakage of air to the outside, said open position being sustained for at least one of a predetermined time interval $\Delta t$ after reaching a pressure value $P_0$, the predetermined time interval $\Delta t$ after reaching a temperature value $T_0$ corresponding to the pressure value $P_0$, until a predetermined pressure value $P_1$ is reached, and until a predetermined temperature value $T_1$ is reached, where $P_1 > P_0$, and $T_1 > T_0$, said appliance being provided with a closure/opening safety means whose position is sensitive to the pressure prevailing in the bowl, and which is mounted to move between two stable abutment positions, namely a first position in which said closure/opening safety means puts the inside of the bowl into communication with the outside below the determined pressure $P_0$, and a second position in which said closure/opening safety means prevent opening of the appliance and close off communication from the bowl to the outside when the pressure $P_0$ is reached, so as to allow the pressure inside the appliance to increase and so as to allow cooking to take place.

2. The appliance of claim 1, wherein said calibrated air leakage means further comprises said at least one calibrated opening (6) configured for leakage to take place that is equivalent to an opening of 1.75 mm² to 4.15 mm², and preferably about 2.80 mm², and a movably mounted closure element associated with said at least one calibrated opening.

3. The appliance of claim 1, wherein the calibrated air leakage means is configured to react to the temperature prevailing in the appliance.

4. The appliance of claim 3, wherein the calibrated air leakage means further comprises one of a bimetallic disk, a wax actuator, and a solenoid valve associated with a temperature sensor.

5. The appliance of claim 4, wherein the calibrated air leakage means further comprises a heavy valve pintle supported by a bimetallic disk, the bimetallic disk being supported by a main body mounted facing an opening in the lid, so that the calibrated opening is defined between said pintle and the opening forming a seat for receiving the pintle in leaktight manner when the bimetallic disk is in the closed position.

6. The appliance of claim 5, wherein the opening underlies a tubular body, a top portion of which forms the seat for receiving the pintle, the main body being formed by a removable cap fitting over said tubular body.

7. The appliance of claim 4, wherein the calibrated air leakage means further comprises a heavy valve pintle supported by a bimetallic disk, the bimetallic disk being supported by a tubular body mounted facing an opening in the lid, said opening forming a seat for receiving the pintle in leaktight manner when the bimetallic disk is in the closed position, the calibrated opening being formed by openings defined in a crenellated collar forming an abutment for the tubular body.

8. The appliance of claim 1, wherein the calibrated air leakage means is configured to react to the pressure prevailing in the appliance.

9. The appliance of claim 1, wherein the calibrated air leakage means are incorporated in the closure/opening safety means.

10. The appliance of claim 9, wherein the calibrated air leakage means are incorporated in an Aroma pintle and, by way of a moving closure element, are provided with a bimetallic disk supported by the Aroma pintle.

11. The appliance of claim 10, wherein the calibrated leakage means are incorporated in a first Aroma pintle and are formed by a second Aroma pintle that is concentric with the first Aroma pintle, and that is mounted to move relative to the first Aroma pintle.

12. The appliance of claim 8, wherein the calibrated air leakage means are formed by a deformable gasket element that is configured to be deformed by the pressure and close off the calibrated hole.

13. The appliance of claim 12, wherein the deformable gasket is incorporated in a bore in the lid of the appliance, and has a deformable diaphragm with a central well in which at least one calibrated hole is provided, said central well being terminated by a sealing face configured to press against the body of the gasket to form a sealing seat from a pressure at least equal to $P_1$.

14. The appliance of claim 13, wherein an Aroma pintle is mounted in the central well to slide freely between two abutment positions.

15. The appliance of claim 3 wherein the calibrated air leakage means are incorporated in a ramp of a safety valve member.

16. The appliance of claim 15, wherein the calibrated air leakage means further comprises a bimetallic disk mounted in resilient abutment against the ramp of the valve member, the ramp being mounted to move relative to the calibrated hole so that the ramp comes to open or to close the calibrated hole depending on the position of the bimetallic disk.

17. The appliance of claim 1, wherein the calibrated air leakage means further comprises at least one of a temperature sensor and a pressure sensor for sensing when the temperature $T_0$ and the pressure $P_0$ is reached, respectively, and a timer for counting down the predetermined time $\Delta t$ as from the instant at which $P_0$ or $T_0$ is reached, and an opening and closure system for opening and closing the calibrated hole.

18. The appliance of claim 1, wherein the calibrated air leakage means are organized on the lid of the cooking appliance.

* * * * *

UNITED STATES PATENT AND TRADEMARK OFFICE
CERTIFICATE OF CORRECTION

PATENT NO. : 7,624,674 B2 Page 1 of 1
APPLICATION NO. : 10/484361
DATED : December 1, 2009
INVENTOR(S) : Chameroy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1439 days.

Signed and Sealed this

Twenty-sixth Day of October, 2010

David J. Kappos
*Director of the United States Patent and Trademark Office*